United States Patent Office 2,983,622
Patented May 9, 1961

2,983,622
PROCESS FOR PRODUCING DECORATIVE SURFACE COVERING

John Biskup, Chatham, Spencer Johnson, Pompton Plains, and Paul C. Wetterau, Mountain Lakes, N.J., assignors to Congoleum-Nairn Inc., Kearny, N.J., a corporation of New York No Drawing. Filed July 22, 1958, Ser. No. 750,098

5 Claims. (Cl. 117—15)

This invention relates to a process for producing printed surface coverings and in particular to backing sheets useful in the production of printed surface coverings which have a fused upper layer of wear resisting composition.

A simplified flow diagram showing the process is as follows:

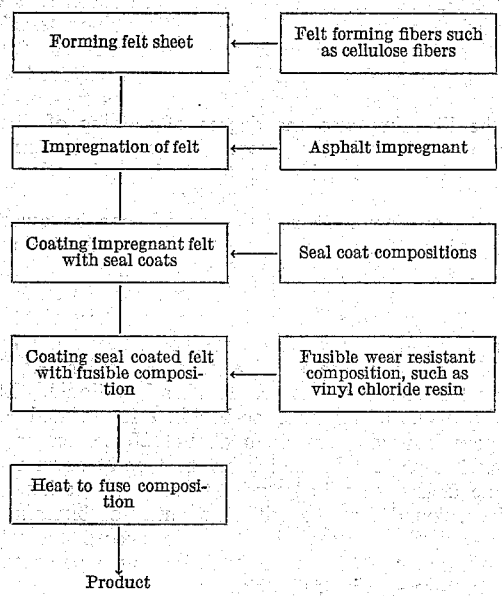

Decorative surface coverings having a printed decorative and wear resisting composition layer bonded to a backing are well known and find wide application as coverings for floors, walls and the like. It has been conventional practice to utilize a felted fibrous sheet as a backing material for such products. The felt sheet is impregnated with a water proofing and strengthening impregnant. The most common impregnant used is a bituminous material such as asphalt, due to its low cost. The printed surface coverings produced utilizing an asphalt impregnated felt backing sheet are in general of two main types. The first type has a relatively thick layer of printed composition which forms the dual function of representing the desired decorative design and also being the layer of wear resisting composition. In this type of printed surface covering the decorative design layer is directly subject to wear after the installation of the product. This decorative and wear resisting layer has been most commonly applied by means of a flat bed printing machine. The second type of printed surface covering comprises an extremely thin printed design layer which is conventionally applied by means of high speed rotogravure printing technique. The decorative design is protected by a clear layer of wear resisting composition which is applied to the product after printing.

In recent years vinyl resins have been developed which have excellent wear resisting properties and exhibit a high degree of resistance to attack by household chemicals and stains. These resins have become available at sufficiently attractive prices to warrant their use in the production of such printed surface coverings. A vinyl resinous composition can be pigmented to any desired hue and then printed upon a backing using a flat bed printing machine to produce a product of the first type as described above, or, alternately, a clear vinyl resinous composition can be used to form a clear wear resisting layer in the production of products of the second type. In either case, the vinyl resinous composition is applied in liquid form, as for example an organosol or a plastisol. In such compositions the vinyl resin is present as minute particles of pure resin dispersed in a liquid medium which is either a plasticizer for the resin in the case of a plastisol, or a mixture of plasticizer and volatile solvent in the case of an organosol. In order that the composition can attain the optimum properties of strength, durability and flexibility, the resin must become solvated or plasticized by the plasticizer. This takes place through a process known as fusion. In order to fuse vinyl resinous compositions the composition must be subjected to high temperatures, commonly in the range of about 325° F. to about 375° F. Since the vinyl composition is in intimate contact with the backing material it is apparent that the entire product is subjected to these elevated temperatures during fusion.

A bituminous material such as asphalt is of a thermoplastic nature, that is, it becomes soft and even fluid when subjected to heat. It has been found when a vinyl resinous composition is applied to an asphalt saturated felt and the mass subjected to heat sufficient to fuse the resinous composition, bleeding and blistering of the asphalt occurs with the result that the vinyl resinous layer becomes discolored and attains an irregular texture. It is conventional in the manufacture of printed surface coverings to apply seal coats to the surface of the felt backing upon which the decorative and wear resisting composition layer or layers are to be applied. In addition, it is conventional to apply coatings to the back of the felt in order that the finished product will not have an undesirable black color on its back.

It was found through skillful formulation of seal coatings that a printed surface covering could be subjected to temperatures sufficient to fuse a vinyl resinous composition without bleeding of the asphalt with resulting discoloration of the vinyl resinous composition layer. Although it has been possible to prevent bleeding through the use of seal coats the problem of blistering still remains. When a seal coated asphalt saturated felt sheet blisters the seal coat film separates from the surface of the saturated felt backing and the seal coat film becomes permanently stretched. As a result the presence of blisters is clearly evident in the finished product, thus rendering it unsatisfactory.

When blistering was first observed in printed surface coverings having an asphalt saturated back it was assumed that the blistering was a result of the liberation of volatile materials within the felt as a result of the high temperature treatment during the fusion. It was thought that the presence of moisture in the asphalt impregnated felt might be the cause of blistering. Impregnated felt sheets were dried for extended periods of time both by heat and also in the presence of highly effective desiccating agents, such as concentrated sulfuric acid. When these treated samples were seal coated and then a vinyl resinous composition applied to the seal coat and subjected to fusion temperatures, blisters still occurred.

In addition to the problem of blistering, the bleeding of asphalt particularly out the back of the sheet has been a frequently encountered problem. As an aid in coat control it is desirable to use relatively inexpensive paint formulations as backing paints. It has been found that where blistering is observed on the upper surface of printed surface coverings subjected to fusion temperatures, very frequently bleeding is encountered out the back of the product. This bleeding results in spots of asphalt on the back of the product which can become transferred to the wearing surface when the product is rolled up. In addition, these spots are unsightly and can discolor walls or other objects with which they come in contact during installation of the product. Still further, bleeding of asphalt can result in the formation of gummy deposits upon rolls and other processing equipment which seriously interferes with manufacturing operations. More expensive backing paints than those currently used could be utilized to minimize bleeding but this would greatly increase the cost of producing the product. In any case, even if bleeding out the back of the product can be controlled, there is still the serious problem of blistering.

It is an object of the invention to provide an asphalt impregnated fibrous backing sheet for use in the production of printed surface coverings which can withstand the elevated temperatures required to fuse a vinyl resinous composition without blistering. It is another object of the invention to provide an asphalt impregnated fibrous backing sheet for use in the production of printed surface coverings which can be subjected to the elevated temperatures required to fuse a vinyl resinous composition without bleeding of asphalt out the back of the product. Other objects and the advantages of the invention will appear hereinafter.

In accordance with the invention it has been found that an asphalt impregnated fibrous backing sheet can withstand fusion temperatures of the degree required to fuse a vinyl resinous composition without blistering and bleeding if the amount of asphalt in the fibrous backing sheet is controlled so as not to exceed a definite critical quantity and where the asphalt is uniformly distributed throughout the impregnated fibrous backing sheet.

The fibrous base for use in the invention is preferably a web of felted fiber. The felt generally is produced using a Fourdrinier or cylinder paper machine with the thickness of the resulting sheet being that usually used in floor and wall coverings, that is, from 0.02 to 0.08 inch is usually preferred. The fibrous material used is normally cellulosic in origin, although other fibers can be used including those of mineral and animal origin. The sources of cellulosic material can include cotton or other rag material, wood pulp including both ground and chemical wood pulp, paper, boxes, or mixtures thereof in any proportion. The web can also contain fillers such as wood flour.

In accordance with the invention the felted fibrous sheet is strengthened and improved in water resistance by impregnation with a bituminous material. Numerous bituminous materials are well known as impregnants in the production of printed surface coverings and include asphalts of petroleum of natural origin and tars and pitch residues of enamel or vegetable origin. These materials can be treated to attain the desired physical properties of softening point or viscosity for satisfactory impregnation by such treatment as air blowing, steam distillation and the like. The bituminous material is conventionally incorporated into the felt by hot melt impregnation technique. A bath of molten bituminous material such as asphalt is maintained at a high temperature at which the material is in a liquid state. With the asphalts which are commonly used as impregnants in the production of impregnated felt (a typical asphalt having a melting point between 140 and 150° F.), a bath temperature in the neighborhood of 400 to 450° F. is normally used. Alternately, the bituminous material can be dissolved in a suitable solvent and the resulting solution used to impregnate the felt sheet. This method is generally not as desirable since the impregnated sheet must be dried to remove the solvent. Alternately, the bituminous material can be incorporated with the fibers during manufacture of the felted fibrous sheet. In this technique, a bituminous emulsion can be added to the water dispersion of fibers in the beater prior to the sheet forming step. In the beater addition technique, the bituminous material is precipitated onto the surface of the fibers.

In accordance with the invention, it has been found that a bitumen impregnated felt which is provided with seal coats can successfully withstand fusion temperatures as high as 400° F. without blistering or bleeding if the quantity of bituminous impregnant is controlled so as not to exceed a definite critical amount and is uniformly distributed throughout the sheet. Initially, it was believed that the critical amount of bituminous impregnant could be expressed as a percentage by weight of the felt. It was then found that certain felts when impregnated with a given percentage by weight of asphalt would show blisters when seal coated and exposed to high temperatures whereas other felts would not. A study was then made to determine if there was some common denominator which could be used as a basis for expressing the critical amount of bituminous impregnant in a felt sheet. It was discovered that the critical amount was related to the absorption characteristics of the particular felt used. The absorption characteristics of felt are influenced principally by the properties of the fibers used to make up the felt and are determined not only by the particular type of fiber, such as rags, wood and the like, but also the degree of refining of fibers prior to the sheet forming step. In the manufacture of felt, the fibers are subjected to mechanical action in beaters, Jordan machines and the like.

The absorption characteristics of felt can be quantitatively determined with respect to a standard liquid medium such as kerosene. The amount of kerosene which can be absorbed in a fibrous sheet expressed as the percent kerosene by weight based on the weight of dry fibers is defined as the kerosene value of the felt. The higher the kerosene value of a particular felt the greater the ability of the felt to absorb a liquid. The kerosene value of felt used as backings for printed surface coverings can vary from about 120 percent to as high as 200 percent depending on the type of fibers used and the degree of refining prior to sheet formation. It has been found that the critical quantity of bituminous impregnant incorporated into felt in accordance with the invention can be accurately defined as a percentage of the kerosene value of the felt.

The kerosene value of felt is related to the maximum amount of kerosene that can be absorbed by a bone dry sample of a particular felt according to the test as prescribed in "Underwriters Laboratories, Inc., Standard for Class 'C' Asphalt Organic Felt Sheet Roofing and Shingles," tenth edition, September 1953.

In accordance with this test, a sample of felt is dried for at least one hour in an oven maintained at 200° F. The dried sample is cooled in a desiccator and weighed. It is suspended by a hook through one corner in 1 liter of kerosene maintained at 77° F. Vacuum (not less than 28 inches of mercury) is applied for at least 15 minutes or until bubbles cease to come from the sample. The sample is removed from the kerosene and allowed to drain for 3 minutes plus or minus 1 second with the lower corner touching the edge of the testing vessel. The saturated sample is then weighed and the kerosene value of the felt is determined as the weight of kerosene absorbed, expressed as a percentage of the weight of the dry felt.

It has been found that where the amount of bituminous impregnant in a felt sheet is less than 60 percent of the kerosene value of the felt and is uniformly distributed within the felt, the felt can be seal coated and subjected to high temperatures without the development of blisters. Felt manufacture should be carefully controlled too so that the felt has uniform absorption characteristics throughout. Where a felt contains areas of low absorptivity, it is apparent that a given weight percentage of bituminous impregnant, although below 60 percent of the kerosene value throughout most of the felt, may exceed the critical value in the areas of low absorptivity. It would then be anticipated that blisters would appear over these areas when the felt is seal coated and subjected to high temperatures. Therefore, it is necessary, for complete absence of blisters, that the amount of bituminous impregnant be less than 60 percent of the kerosene value of the felt in all parts of the felt.

It is essential that the bituminous impregnant be uniformly dispersed throughout the felt sheet. This can be controlled to some extent by the saturating technique through use of pressure rolls in the saturating bath. Where the bituminous impregnant is not uniformly dispersed throughout the felt blistering can frequently occur due to high concentrations of bituminous material adjacent to one surface of the felt. Although careful control of the impregnation process can greatly aid in attaining uniform impregnation, it has been found that the disposition of impregnant can be still further improved by subjecting the impregnated felt to a heat treatment step. The length of the heat treatment depends upon the temperature employed. Thus heat treatment for 2 to about 5 minutes at 350° F. or at 195° F. for from about 2 hours to as long as 4 days can be used.

The amount of bituminous impregnant should preferably be as close to the critical maximum as can be attained in normal manufacturing operations. This is necessary in order that the impregnated felt have the optimum possible strength and water resistance. The amount of bituminous impregnant should be at least 35 percent of the kerosene value of the felt in order to obtain a satisfactory product.

In the production of printed surface coverings utilizing backing sheets impregnated with a controlled amount of bituminous material in accordance with the invention the backing is provided with one or more seal coats prior to the application of the decorative design. The seal coats perform the desirable function of masking the dark color of the bituminous impregnant and in addition create a smooth uniform surface suitable as a base for printing. Felt sheets of the type commonly used as backings for printed surface coverings tend to have minor surface irregularities due to non-uniformities in the felt making equipment. The sheet also frequently shows a number of small protruding lengths of fibers. The seal coats are designed to hide all these irregularities. The total thickness of seal coats required is normally from about 0.004 to about 0.012 inch. This thickness can be created through use of a single thick coating or several superposed thinner coatings. Using the conventional techniques of coating such as flexible doctor roller application the desired thickness is created by use of more than one coating. The use of multiple coatings is also desirable in promoting optimum adhesion of the wearing surface layer to the backing, since the seal coat applied directly to the fibrous backing can be designed for optimum sealing against migration of bituminous impregnant and the uppermost seal coat can be designed for optimum adhesion to the polyvinyl chloride wearing surface layer.

The seal coats are preferably applied in the form of an aqueous emulsion of resinous binder and filler. In the preparation of the seal coats, the resinous binder and filler are emulsified in water in the presence of conventional wetting agents, thickening agents, anti-foam agents, sequestering agents and the like. After the application of each seal coat to the fibrous backing sheet, the coating is dried by subjecting the sheet to a temperature as for example in the range of about 100° F. to about 150° F. for about 30 minutes to about 2 hours. Alternately, drying can be effected by exposing the coated sheet after the application of each seal coat to a temperature of 350° F. to 400° F. for 1 to 5 minutes.

The resinous binder preferably comprises a vinyl resin, that is, a polymeric material obtained by polymerizing compounds containing at least one $-CH=C<$ radical. Useful vinyl resins include homopolymers, such as polymerized vinyl chloride, polyvinyl acetate, polyvinyl propionate, polyvinyl butyrate, polymerized vinylidene chloride, polymerized acrylic acid, polymerized ethyl acrylate, polymerized methyl acrylate, polymerized butyl acrylate, and the like; copolymers of the above with each other such as vinyl chloride-vinyl acetate copolymer, vinylidene chloride-vinyl chloride copolymer, methyl methacrylate-vinyl chloride copolymer, ethyl acrylate-methyl acrylate copolymer and the like and copolymers of the above with other monomers copolymerizable therewith, such as maleic acid, fumaric acid, chloromaleic acid and the like. If desired, a mixture of vinyl resins can be used in formulating the resinous binder for use in seal coating paints.

In addition to the vinyl resin, the resinous binder can contain a plasicizer for the resin, including ester type plasticizers such as tributyl phosphate, dioctyl phthalate, dipropylene glycol dibenzoate, phenyl phosphate, dibutyl tartrate, amyl tartrate, butyl benzyl benzoate, dibutyl sebacate, dioctyl adipate, didecyl adipate and the like. Rubbery plasticizers can also be used, such as butadiene-styrene copolymer, butadiene acrylonitrile copolymer and the like. The seal coating paints contain in addition large amounts of filler, the term filler embracing both coloring pigments and inert extenders, and frequently containing as much as 85 percent filler by weight of the dry seal coat.

The seal coat composition which is applied directly to the backing is preferably a composition which has good sealing properties against migration of asphalt impregnant. The seal coat composition which is applied directly to the backing can be a pigmented and filled oleoresinous composition. However, for optimum sealing properties against the migration of bituminous impregnant the first seal coat preferably is formed of a vinyl resinous binder as described above in the presence of pigment and filler. Backing sheets produced in accordance with the invention find particular utility in the production of printed surface coverings which have an exposed layer of fused vinyl resinous composition. It is essential, therefore, that the composition used for the uppermost seal coat be one which has a high degree of compatibility with the fused vinyl resinous layer. Thus, in the fusion process the seal coat becomes firmly and integrally bonded to the fused wearing surface layer. In addition, the seal coats themselves should have a high degree of mutual compatibility to insure the optimum adhesion of the coats to each other.

The seal coated backing is then printed with a decorative design using any of the conventional techniques of printing. A relatively thick layer of decorative composition can be printed using the flat bed printing technique in which case a separate clear wearing surface layer is not needed. Alternately, the decoration can be applied by means of rotogravure printing after which a clear wear resisting composition layer is applied which serves to protect the design during the life of the product.

The composition used for creating the decorative design in the production of products by flat bed printing technique is a vinyl resinous print paint composition pigmented in the desired colors. The vinyl resin is most commonly either polyvinyl chloride or a copolymer of vinyl chloride such as vinyl chloride-vinyl acetate copolymer. In the production of products where printing is carried out by the rotogravure technique the decorative design composition is conventionally a vinyl resinous printing ink, that is, a solution of vinyl resin such as polyvinyl chloride in a volatile solvent. After the ink has dried a uniform layer of clear wear resisting vinyl resinous composition is applied. This composition is conventionally a plastisol or organosol of polyvinyl chloride.

In either technique of printing the product is subjected to heat in order to fuse the exposed surface layer of vinyl resinous composition. Where polyvinyl chloride compositions are used the composition must attain a temperature of about 350° F. to bring about fusion. This heat treatment can be brought about by exposing the surface of the product to infra-red lamps or the product can be passed through a hot air oven with the temperature of the oven and the residence time of the sheet therein being sufficient so that the composition reaches the fusion temperature.

When printed surface coverings are produced as described hereinabove using backing sheets impregnated with a controlled amount of bituminous impregnant it has been found that the product can withstand the high temperatures in the fusion oven without detrimental effects. When, however, the amount of bituminous impregnant exceeds the critical amount of 60 percent of the kerosene value of the fibrous sheet the fusion step results in blistering which is manifested by separation of the seal coats from the fibrous sheet with resulting stretching of the seal coat film. When this condition occurs the finished product is unacceptable. In addition, where the critical amount of asphalt in the fibrous sheet is exceeded, spots of bituminous impregnant are formed on the back of the product as a result of bleeding of bituminous impregnant from the fibrous sheet. This can cause operating difficulties and also results in the formation of an unsatisfactory product.

The following examples are given for purposes of illustrating the invention:

Example I

Samples of a felt (9 by 15 inches in size with a thickness of 0.055 inch) having a kerosene value of 185 percent were impregnated with varying amounts of asphalt having a melting point of 145° F. The samples were heat treated at 195° F. for 3 days to insure uniform distribution of asphalt. Each sample was then double seal coated on one surface with oleoresinous seal coating paint compositions, the sample being dried after the application of each coating. A backing paint comprising a soya protein binder was applied to the opposite surface of the sheet and the backing paint was dried.

Each coated and backed sample was placed under infra-red lamps and subjected to a temperature of 375° F. for 2 minutes to determine the effect of high temperatures upon felt samples impregnated with varying percentages of asphalt. The results are shown in the following table:

| Sample Number | Percent Asphalt by Weight of Felt | Asphalt as Percent of Kerosene Value | Remarks |
| --- | --- | --- | --- |
| 1 | 77 | 42 | No blistering. |
| 2 | 107 | 58 | Do. |
| 3 | 110 | 59 | Two small blisters. |
| 4 | 114 | 61 | No blistering. |
| 5 | 121 | 65 | Medium blistering. |
| 6 | 122 | 66 | Do. |
| 7 | 123 | 67 | Do. |
| 8 | 133 | 72 | Do. |
| 9 | 139 | 75 | Bad blistering. |
| 10 | 149 | 81 | Do. |
| 11 | 157 | 85 | Do. |
| 12 | 168 | 91 | Do. |

Blistering was manifested by the separation of the seal coat film from the surface of the felt. In the case of bad blistering, the individual blisters were frequently as large as 5 inches in diameter. The results of the series of tests indicates that the critical percentage of impregnation occurs within a narrow range of asphalt contents at 60 percent of the kerosene value of the felt.

Example II

A felted fibrous sheet having a kerosene value of 185 percent was impregnated with asphalt having a melting point of 145° F. in an amount constituting 90 percent by weight of the felt, that is, 49 percent of the kerosene value of the felt.

A filled butadiene-styrene copolymer emulsion paint was applied to one surface of the impregnated felt as a backing paint and dried thereon. The opposite surface of the impregnated felt was coated with an aqueous emulsion first seal coat comprising 14 parts vinylidene chloride-vinyl chloride copolymer, 5 parts butadiene-styrene copolymer and 80 parts of calcium carbonate filler. The seal coat was dried and a second seal coat comprising 20 parts vinylidene chloride-vinyl chloride copolymer, 10 parts butadiene-acrylonitrile copolymer and 72 parts of calcium carbonate filler was applied to the dried first seal coat. The second seal coat was dried and a third seal coat comprising 15 parts polyvinyl chloride, 15 parts butadiene acrylonitrile and 68 parts calcium carbonate and titanium dioxide filler was applied to the dried second seal coat and was dried thereon. The coated and backed sheet was then ready for printing.

A decorative design was applied to the dried third seal coat by multi-cylinder rotogravure printing technique using a vinyl resin based printing ink. After drying to remove solvent in the ink, an organosol of polyvinyl chloride was coated upon the decorative design and the sheet passed through an oven maintained at 400° F. to remove the volatile solvent in the organosol and to cause the polyvinyl chloride to become solvated by the plasticizer in the organosol, thereby fusing the polyvinyl chloride.

The product, after cooling and inspection, was rolled up and packaged for sale. No blistering was observed and no asphalt impregnant bled out the back of the product.

Although the invention has been described with reference to use of the impregnated fibrous sheet as a backing for a decorative surface covering having a fused vinyl resinous wearing surface layer, it is apparent that the discovery of a bitumen impregnated fibrous sheet does not bleed or blister is not limited to use with a particular wearing surface composition. Felt produced in accordance with the invention can be used with advantage in the manufacture of any product that must be subjected to temperatures up to 375° F. during manufacture. In addition to the vinyl resins, other wear resisting compositions that require high temperature treatment include such resins as polyethylene, polyurethanes, polyester resins and the like.

Any departure from the foregoing description that conforms to the present invention is intended to be included within the scope of the claims.

We claim:

1. In a process for producing a decorative surface covering for floors, walls and the like comprising applying a seal coat to one surface of a water resistant impregnated fibrous backing sheet for preventing bleeding of the impregnant through the seal coat, covering said seal coat with a fusible wear resistant composition layer and thereafter heating the thus formed product to fuse said wear resistant composition, the improvement which comprises utilizing as said backing, a fibrous sheet uniformly impregnated with asphalt in an amount between 35% and 60% of the kerosene value of said fibrous sheet.

2. In a process for producing a decorative surface covering for floors, walls and the like comprising applying a seal coat to one surface of a water resistant impregnated felt backing sheet for preventing bleeding of the impregnant through the seal coat, applying a decorative design to the surface of said seal coat, covering said seal coat and decorative design with a fusible wear resistant layer of thermoplastic composition and thereafter heating the thus formed product to fuse said thermoplastic composition, the improvement which comprises utilizing as said backing a fibrous sheet uniformly impregnated with asphalt in an amount between 35% and 60% of the kerosene value of said fiibrous sheet.

3. In a process for producing a decorative surface covering for floors, walls and the like comprising applying a plurality of seal coats to one surface of a water resistant impregnated backing sheet for preventing bleeding of the impregnant through the seal coats, the total thickness of said seal coats being between 0.004 and 0.012 inch, printing a decorative design on the exposed surface of the last applied seal coat, covering said seal coats and decorative design with a fusible wear resistant layer of vinyl resinous composition which is fusible at a temperature not exceeding 375° F. and heating the thus formed product to fuse said vinyl composition, the improvement which comprises utilizing as said backing a fibrous sheet uniformly impregnated with a substantial amount of asphalt in an amount not exceeding 60% of the kerosene value of said fibrous sheet.

4. In a process for producing a decorative surface covering for floors, walls and the like comprising applying a plurality of seal coats of vinyl resinous composition to one surface of a water resistant impregnated backing sheet for preventing bleeding of the impregnant through the seal coat, the total thicknes of said seal coats being between 0.004 and 0.012 inch, applying a decorative design on the exposed surface of the last applied seal coat, covering said seal coats and decorative design with a fusible layer of vinyl composition which is fusible at a temperature not exceeding 375° F. and heating the thus formed product to fuse said vinyl compositions, the improvement which comprises utilizing as said backing a cellulosic fibrous felt sheet uniformly impregnated with asphalt in an amount between 35% and 60% of the kerosene value of said felt sheet.

5. In a process for producing a decorative surface covering for floors, walls and the like comprising coating one surface of a water resistant impregnated backing sheet with a plurality of seal coats of vinyl resinous composition for preventing bleeding of the impregnant through the seal coats, the total thickness of said seal coats being between 0.004 and 0.012 inch, printing a decorative design on the exposed surface of the last applied seal coat, applying a uniform coating of a fusible vinyl chloride composition over the surface of said seal coats and decorative design and heating the thus formed product to fuse said vinyl composition, the improvement which comprises utilizing as said backing a cellulosic fibrous felt sheet uniformly impregnated with asphalt having a melting point between about 140 and about 150° F. in an amount between 35% and 60% of the kerosene value of said felt sheet.

References Cited in the file of this patent

UNITED STATES PATENTS

| 2,121,679 | Arvin et al. | June 21, 1930 |
|---|---|---|
| 2,560,420 | Dodge | July 10, 1951 |
| 2,624,682 | Hazeltine | Jan. 6, 1953 |
| 2,705,684 | Hazeltine | Apr. 5, 1955 |
| 2,707,157 | Stanton et al. | Apr. 26, 1955 |
| 2,721,146 | Hardman | Oct. 18, 1955 |
| 2,742,377 | Bezman | Apr. 17, 1956 |
| 2,748,042 | Borgese | May 29, 1956 |
| 2,769,726 | Wetterau et al. | Nov. 6, 1956 |
| 2,771,824 | Patch et al. | Nov. 27, 1956 |
| 2,774,685 | Carnegie | Dec. 18, 1956 |
| 2,784,113 | Hazeltine | Mar. 5, 1957 |
| 2,801,937 | Hess | Aug. 6, 1957 |
| 2,930,106 | Wrotnowski | Mar. 29, 1960 |

UNITED STATES PATENT OFFICE
CERTIFICATION OF CORRECTION

Patent No. 2,983,622

May 9, 1961

John Biskup et al.

It is hereby certified that error appears in the above numbered patent requiring correction and that the said Letters Patent should read as corrected below.

Column 1, before line 15, insert the following paragraph:

This application is a Continuation-in-Part of United States Patent Application Ser. No. 586,023, filed May 21, 1956, now abandoned.

column 2, line 72, for "coat" read -- cost --; column 6, line 22, for "plasicizer" read -- plasticizer --; column 8, line 43, after "sheet" insert -- that --; column 9, line 7, for "apply-" read -- applying --.

Signed and sealed this 31st day of October 1961.

(SEAL)
Attest:

ERNEST W. SWIDER
Attesting Officer

DAVID L. LADD
Commissioner of Patents